(12) United States Patent
Stephenson

(10) Patent No.: US 11,454,222 B2
(45) Date of Patent: Sep. 27, 2022

(54) DUAL TURBINE DIRECT DRIVE PUMP

(71) Applicant: Halliburton Energy Services, Inc., Houston, TX (US)

(72) Inventor: Stanley V. Stephenson, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 261 days.

(21) Appl. No.: 16/342,755

(22) PCT Filed: Nov. 29, 2016

(86) PCT No.: PCT/US2016/063988
§ 371 (c)(1),
(2) Date: Apr. 17, 2019

(87) PCT Pub. No.: WO2018/101912
PCT Pub. Date: Jun. 7, 2018

(65) Prior Publication Data
US 2020/0049136 A1    Feb. 13, 2020

(51) Int. Cl.
*F04B 9/02*     (2006.01)
*F04B 17/00*    (2006.01)
(Continued)

(52) U.S. Cl.
CPC ............... *F04B 9/02* (2013.01); *F04B 17/00* (2013.01); *F04B 17/06* (2013.01); *F04B 35/00* (2013.01)

(58) Field of Classification Search
CPC .. F04B 9/02; F04B 35/00; F04B 17/00; F04B 17/06
See application file for complete search history.

(56) References Cited

U.S. PATENT DOCUMENTS 1,066,635 A * 7/1913 McDonald .......... F04D 29/4293
                                                    417/351
1,973,070 A * 9/1934 Hess ..................... F04D 13/064
                                                    417/369
(Continued)

FOREIGN PATENT DOCUMENTS

CN      102602323 A    7/2012
WO   2010/038219 A2    4/2010

OTHER PUBLICATIONS

International Search Report and Written Opinion issued in related PCT Application No. PCT/US2016/063988 dated Aug. 17, 2017, 15 pages.

*Primary Examiner* — Christopher S Bobish
(74) *Attorney, Agent, or Firm* — Conley Rose, P.C.; Rodney B. Carroll

(57) ABSTRACT

A pump system and method of operating the same may utilize two relatively smaller turbines that are attached to and used to power a single pump. The two turbines are releasably coupled to the pump via respective one-way clutches, thereby enabling the use of one or both turbines at a time to power the pump. At low loads (e.g., low pump outputs), only one turbine operates to power the pump, and at higher loads (e.g., high pump outputs), both turbines operate to power the pump. By using two smaller turbines instead of one large turbine, the range-ability of the turbine power at the most efficient operating ranges is increased. This improves the fuel efficiency of the pump system. In addition, the dual turbine driven pump system provides increased reliability by preventing the loss of all power to the pump in the event of a turbine malfunction.

20 Claims, 3 Drawing Sheets

(51) Int. Cl.
 *F04B 17/06* (2006.01)
 *F04B 35/00* (2006.01)

(56) References Cited

U.S. PATENT DOCUMENTS

| | | | | |
|---|---|---|---|---|
| 2,698,394 | A * | 12/1954 | Brown | F16H 21/50 310/112 |
| 3,487,657 | A * | 1/1970 | Teegraden | F04B 35/04 62/229 |
| 9,579,980 | B2 * | 2/2017 | Cryer | F04B 47/02 |
| 9,771,878 | B2 * | 9/2017 | Lu | B64D 27/10 |
| 10,138,891 | B2 * | 11/2018 | Pemberton | F04D 1/006 |
| 2001/0048251 | A1 * | 12/2001 | Ieoka | F04C 29/0085 310/49.01 |
| 2004/0219040 | A1 * | 11/2004 | Kugelev | F04B 17/03 417/415 |
| 2007/0110595 | A1 * | 5/2007 | Sato | F04D 13/064 417/351 |
| 2008/0029267 | A1 * | 2/2008 | Shampine | E21B 43/25 166/305.1 |
| 2010/0135825 | A1 * | 6/2010 | Walth | F25J 1/0284 417/44.1 |
| 2012/0275930 | A1 | 11/2012 | Hideg et al. | |
| 2013/0294939 | A1 * | 11/2013 | Gilarranz | F04D 25/0606 417/53 |
| 2014/0093399 | A1 * | 4/2014 | Pratelli | F04B 35/00 417/53 |
| 2014/0255210 | A1 | 9/2014 | Hwang | |
| 2015/0110642 | A1 * | 4/2015 | Dahouk | F04D 7/04 417/16 |
| 2015/0175013 | A1 | 6/2015 | Cryer et al. | |
| 2015/0244293 | A1 * | 8/2015 | Pieder | F04B 15/06 310/112 |
| 2015/0275891 | A1 * | 10/2015 | Chong | F04B 1/0404 417/53 |

* cited by examiner

DUAL TURBINE DIRECT DRIVE PUMP

CROSS-REFERENCE TO RELATED APPLICATION

The present application is a U.S. National Stage Application of International Application No. PCT/US2016/063988 filed Nov. 29, 2016, which is incorporated herein by reference in its entirety for all purposes.

TECHNICAL FIELD

The present disclosure relates generally to treatment operations for hydrocarbon wells, and more particularly, to dual turbine driven systems for well stimulation operations.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Subterranean operations involve a number of different steps such as, for example, drilling a wellbore at a desired well site, treating and stimulating the wellbore to optimize production of hydrocarbons, and performing the necessary steps to produce and process the hydrocarbons from the subterranean formation.

Treating and stimulating a wellbore can include, among other things, delivering various fluids (along with additives, proppants, gels, cement, etc.) to the wellbore under pressure and injecting those fluids into the wellbore. One example treatment and stimulation operation is a hydraulic fracturing operation in which the fluids are highly pressurized via pumping systems to create fractures in the subterranean formation. The pumping systems typically include high-pressure, reciprocating pumps driven through conventional transmissions by diesel engines, which are used due to their ability to provide high torque to the pumps. Over the course of a fracturing operation, however, the diesel engines may consume thousands of gallons of diesel fuel, which is expensive and can be difficult to supply in sufficient quantities in a well site.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
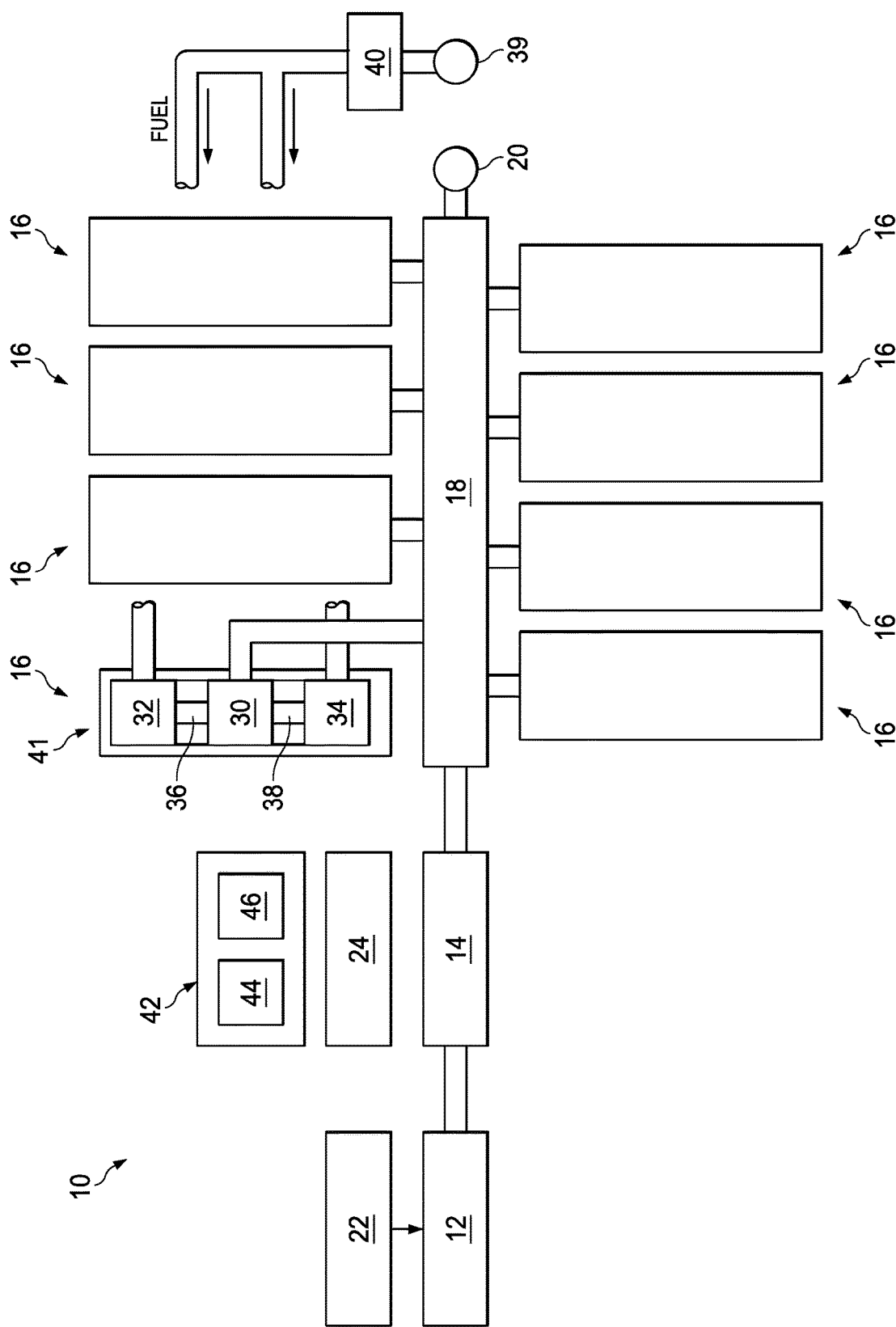
FIG. 1 is a diagram illustrating a system for wellbore treatment and stimulation operations, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

The terms "couple" or "couples" as used herein are intended to mean either an indirect or a direct connection. Thus, if a first device couples to a second device, that connection may be through a direct connection, or through an indirect mechanical or electrical connection via other devices and connections. The term "fluidically coupled" or "in fluid communication" as used herein is intended to mean that there is either a direct or an indirect fluid flow path between two components.

The present disclosure is directed to an efficient and reliable direct turbine driven hydraulic pump system for use in well stimulation operations. Using turbines to power pump systems may enable pump configurations in which diesel engines are entirely excluded from the pumping process, thereby reducing the total diesel fuel consumption necessary to perform a well stimulation operation. Earlier attempts at turbine powered pump systems used a single large turbine powering a single hydraulic pump. Unfortunately, such pump systems operated at relatively low efficiencies due to parasitic loads from the large turbine. Specifically, in high horsepower pumping system arrangements, the driving turbine operates at very low efficiencies when it is running off peak load (e.g., when low pump flow rates are required).

The presently disclosed systems and methods address these shortcomings and others associated with previous attempts at powering pump systems via turbines. The disclosed embodiments utilize two relatively smaller turbines that are attached to and used to power a single pump. The two turbines are releasably coupled to the pump via respective one-way clutches, thereby enabling the use of one or both turbines at a time to power the pump. At low loads (e.g., low pump outputs), only one turbine operates to power the pump, and at higher loads (e.g., high pump outputs), both turbines operate to power the pump.

By using two smaller turbines instead of one large turbine, the range-ability of the turbine power at the most efficient operating ranges is increased. This improves the fuel efficiency of the pump system. In addition, the dual turbine driven pump system provides increased reliability compared to systems that operate using power from just a single turbine. The dual turbine arrangement prevents the loss of all power to the pump in the event of a turbine failure. That is, if one of the two turbines malfunctions, the other turbine will still operate as a backup to maintain at least half the desired pumping output. Still further, the disclosed embodiments may operate without the use of a multi-speed gearbox, thereby allowing smoother control of pump speed.

FIG. 1 is a diagram illustrating an example system 10 for well treatment operations, according to aspects of the present disclosure. The system 10 includes a fluid management system 12 in fluid communication with a blender system 14. The blender system 14 may in turn be in fluid communication with one or more pump systems 16 through a fluid manifold system 18. The fluid manifold system 18 may provide fluid communication between the pump systems 16 and a wellbore 20. In use, the fluid management system 12 may receive water or another fluid from a fluid source 22 (e.g., a ground water source, a pond, one or more frac tanks), mix one or more fluid additives into the received water or fluid to produce a treatment fluid with a desired fluid characteristic, and provide the produced treatment fluid to the blender system 14. The blender system 14 may receive the produced treatment fluid from the fluid management system 12 and mix the produced treatment fluid with a proppant, such as sand, or another granular material 24 to produce a final treatment fluid that is directed to the fluid manifold 18. The pump systems 16 may then pressurize the final treatment fluid to generate pressurized final treatment fluid that is directed into the wellbore 20, where the pressurized final treatment fluid generates fractures within a formation in fluid communication with the wellbore 20.

In accordance with presently disclosed embodiments, the pump systems 16 may be dual turbine direct drive pump systems. The disclosed pump systems 16 may include a pump 30, a first turbine 32, a second turbine 34, a first one-way clutch 36, and a second one-way clutch 38. The first one-way clutch 36 releasably couples the first turbine 32 to the pump 30, while the second one-way clutch 38 releasably couples the second turbine 34 to the pump 30. Although only one of the pump systems 16 of FIG. 1 is illustrated in detail to show these different parts of the dual turbine direct drive pump system, it should be understood that the other pumps 16 of FIG. 1 may feature a similar structure.

Figure 4:
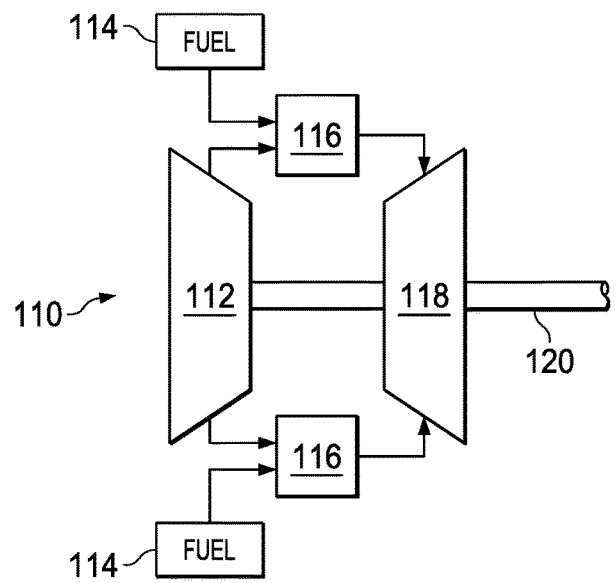
FIG. 4 is a diagram illustrating an example gas turbine, in accordance with an embodiment of the present disclosure.

As used herein, the term "turbine" may generally refer to a gas turbine (i.e., turbine engine) that includes a compressor section, combustion section, and turbine section. An example gas turbine 110 is illustrated in FIG. 4. The compressor section 112 intakes and compresses air to a high pressure. Fuel 114 is injected into the combustion section 116 where it ignites with the compressed air to create a high pressure-high temperature gas that expands as it enters the power turbine section 118. The power turbine section 118 converts energy from the high pressure-high temperature gas into mechanical energy to rotate an output shaft 120.

Turning back to FIG. 1, the two turbines 32 and 34 may be coupled to the pump 30 via the respective one-way clutches 36 and 38. In addition to the elements shown in FIG. 1, the pump system 16 may also include one or more drive shafts and one or more transmissions or gearboxes that transmit energy between the output shafts of the turbines 32 and 34, the one-way clutches 36 and 38, and a driven pump shaft. These elements and their various arrangements are described in greater detail below. The pump 30 may include a reciprocating pump, and the mechanical energy output from the first and second turbines 32 and 34 may be torque that directly drives the pump 30.

In the embodiment shown, the second turbine 34 may be disposed on an opposite side of the pump 30 from the first turbine 32. It should be appreciated, however, that the orientation of the second turbine 34 with respect to the first turbine 32 and the pump 30 is not limited to the embodiment shown. In other embodiments, for example, the second turbine 34 may be positioned on the same side of the pump 30 as the first turbine 32.

The first turbine 32 and second turbine 34 may receive energy or fuel in one or more forms from sources at the well site. The energy or fuel may comprise, for instance, hydrocarbon-based fuel, hydraulic energy, thermal energy, etc. The sources of energy or fuel may comprise, for instance, on-site fuel tanks, mobile fuel tanks delivered to the site, hydraulic pumping systems, etc. The first turbine 32 and second turbine 34 may then convert the fuel or energy into mechanical energy that can be used to drive the associated pump 30. Specifically, the first turbine 32 may generate first mechanical energy to power the pump 30, and the second turbine 34 may generate second mechanical energy to power the pump 30.

In the embodiment shown, the first and second turbines 32 and 34 may each comprise a gas turbine engine. The first and second turbines 32 and 34 may receive a source of fuel from one or more fuel tanks (not shown) that may located within the pumping system 16 and refilled as necessary using a mobile fuel truck driven on site. In other embodiments, the first and second turbines 32 and 34 may receive and utilize natural gas from another wellbore 39 in the field (i.e., "wellhead gas") as fuel. As depicted, the system 10 may include gas conditioning systems 40 that may receive the gas from the wellbore 39 or another source and condition the gas for use in the first and second turbines 32 and 34. Example gas conditioning systems include, but are not limited to, gas separators, gas dehydrators, gas filters, etc. In other embodiments, conditioned natural gas may be transported to the well site for use by the first and second turbines 32 and 34.

In use, the first turbine 32 and second turbine 34 may operate in a side-by side or collinear arrangement to drive the pump 30, with the division of power between the turbines being flexible depending on the application. For instance, in a multi-stage well stimulation operation, the formation may be fractured (or otherwise stimulated) in one or more "stages," with each stage corresponding to a different location within the formation. Each "stage" may be accompanied by an "active" period during which the pumps are engaged and pressurized fluids are being pumped into the wellbore 20 to fracture the formation, and an "inactive" period during which the pumps are not engaged while other ancillary operations are taking place. One of the turbines 32 and 34 may provide all of the torque to the pump 30 during the "inactive" periods in which the torque requirements are relatively low. Both turbines 32 and 34 may be used to provide the torque to the pump 30 during the "active" periods in which the torque requirements are relatively high.

As illustrated, the pump system 16 may include a skid or trailer 41 onto which all components of the pump system 16 are mounted. For example, the pump 30, first turbine 32, second turbine 34, first one-way clutch 36, second one-way clutch 38, and other associated drive shafts, transmission components, and fuel tanks are mounted on the skid or trailer 41. This arrangement may enable the pump system 16 to be assembled at a different location and transported to the well site in one piece. In some embodiments, the skid or trailer 41 may include multiple separate skids/trailers that are transported individually to the well site and easily assembled together there.

In certain embodiments, the pump systems 16 may be communicatively coupled to a controller 42 that directs the operation of the first turbine 32, the second turbine 34, the first one-way clutch 36, and the second one-way clutch 38 of the pump systems 16. The controller 42 may include, for instance, an information handling system that sends one or more control signals to the pump systems 16 to control the speed/torque output of the first turbine 32 and second turbine 34, and to control whether the one-way clutches 36 and 38 are released to decouple the first and second turbines 32 and 34, respectively, from the pump 30. As used herein an information handling system may include any system containing a processor 44 and a memory device 46 coupled to the processor 44 containing a set of instructions that, when executed by the processor 44, cause the processor 44 to perform certain functions. The control signals may take whatever form (e.g., electrical, hydraulic, pneumatic) is necessary to communicate with the associated turbine or clutch. For instance, a control signal to one of the turbines 32 and 34 may include a hydraulic or pneumatic control signal to one or more variable control valves, which may receive the control signal and alter the operation of the gas turbine based on the control signal. A control signal to one of the one-way clutches 36 and 38 may include an electrical control signal to the associated clutch (e.g., electromagnetic clutch), which may receive the control signal and either couple or decouple the associated turbine (32 or 34) from the pump 30.

In certain embodiments, the controller 42 may also be communicatively coupled to other elements of the system, including the fluid management system 12, blender system 14, pump systems 16, and gas conditioning systems 40 in order to monitor and/or control the operation of the entire system 10. In other embodiments, some or all of the functionality associated with the controller 42 may be located on the individual elements of the system, e.g., each of the pump systems 16 may have individual controllers that direct the operation of the associated first and second turbines 32 and 34 and one-way clutches 36 and 38.

Figure 2A:
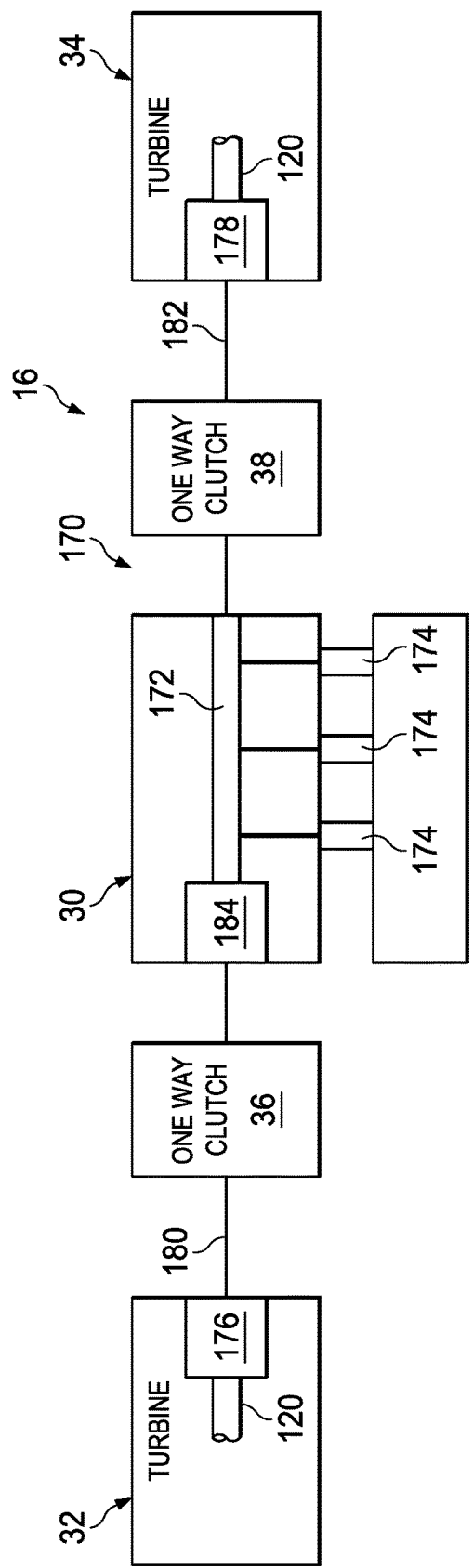
FIGS. 2A and 2B are diagrams illustrating a dual turbine direct drive pump system with turbines disposed on opposite sides of a pump, in accordance with an embodiment of the present disclosure.
Figure 2B:
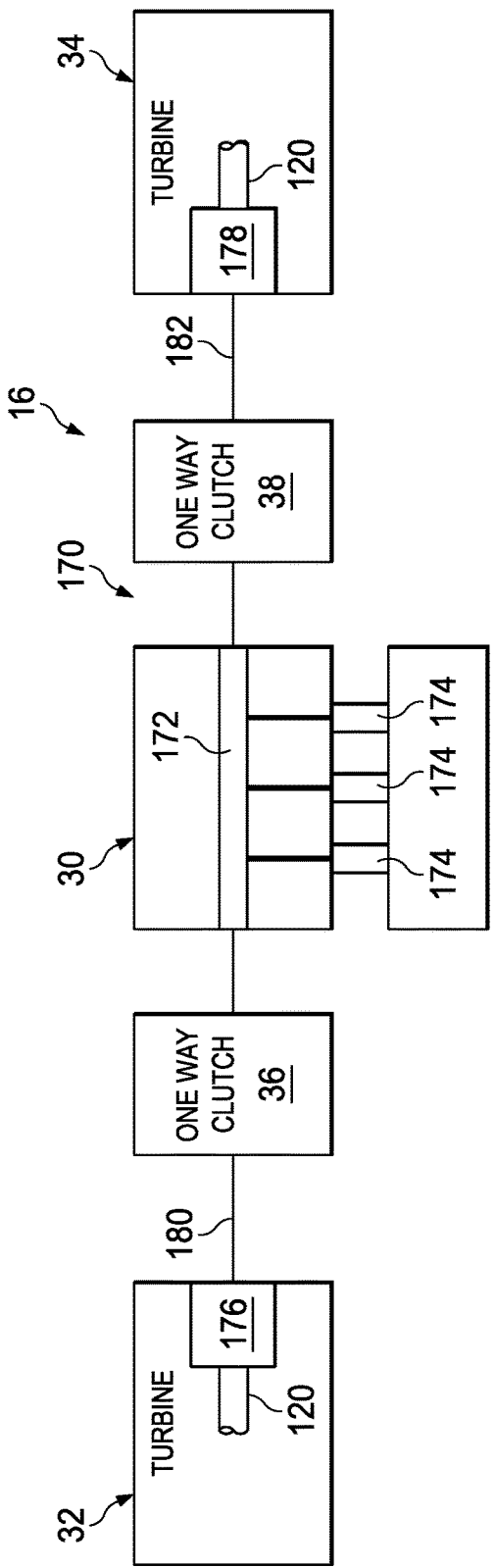

FIGS. 2A and 2B each provide a more detailed block diagram of a dual direct drive turbine pump system 16 that may be utilized in the well stimulation system 10 of FIG. 1. As mentioned above with respect to FIG. 1, the illustrated pump system 16 includes the pump 30, the first turbine 32 selectively coupled to the pump 30 via the first one-way clutch 36, and the second turbine 34 selectively coupled to the pump 30 via the second one-way clutch 38.

In presently disclosed embodiments, the pump system 16 includes two relatively small turbines 32 and 34 that are attached to the same pump 30. When the pump 30 is operating at low loads, only one of the turbines 32 or 34 may be used to provide mechanical energy to the pump 30 for operating the pump 30. That is, one of the turbines 32 or 34 may be in operation while the other of the two turbines 34 or 32, respectively, is not in operation. When the pump 30 is operating at higher loads, both turbines 32 and 34 may be used to provide mechanical energy to the pump 30 for operating the pump 30. This allows the turbines 32 and 34 to operate at higher efficiencies over more of the pump and turbine operating range, as compared to pump systems that utilize a single turbine to power the pump.

Each of the two turbines 32 and 34 are smaller than a single turbine that would have the capacity to provide the maximum amount of mechanical energy needed for a full range of pump operation. Operating only one turbine (32 or 34) at a time to meet lower load requirements of the pump 30 would result in smaller parasitic loads on the turbine than if such a larger single turbine were used. Thus, the disclosed dual turbine pump system 16 that utilizes one small turbine (32 or 34) at low pump loads and both turbines 32 and 34 combined to meet high pump load requirements may operate more efficiently at lower loads than a system that uses a single large turbine to operate the pump.

The distinction between the pump 30 operating at low loads and at high loads may be based on a predetermined threshold of the horsepower from the pump 30. That is, when the horsepower required by the pump 30 is above the predetermined threshold, both turbines 32 and 34 are operated to provide mechanical energy to power the pump 30. When the horsepower required by the pump 30 is below the predetermined threshold, just one of the turbines 32 or 34 may be operated to provide all the mechanical energy to power the pump 30.

As mentioned above, each of the turbines 32 and 34 may be releasably coupled to the pump 30 via a corresponding one-way clutch (36 and 38, respectively). Each of the one-way clutches 36 and 38 may include a one-way sprag clutch, an electromagnetic power clutch, or any other type of one-way clutch. The one-way clutch 36 may releasably couple an output shaft 120 of the first turbine 32 to a drive train 170 of the pump 30. The one-way clutch 38 may releasably couple an output shaft 120 of the second turbine 34 to the drive train 170 of the pump 30. Using one-way clutches 36 and 38 may be desirable so that the transfer of mechanical energy between two pump components only happens in a single direction. That is, the one-way clutches 36 and 38 enable the pump system 16 to transmit torque from one or both of the turbines 32 and 34 to the drive train 170 of the pump 30, but not from the drive train 170 of the pump 30 to either of the turbines 32 and 34.

The one-way clutches 36 and 38 may operate such that any non-running turbine (e.g., 32 or 34) is automatically disconnected from the drive train 170 of the pump 30 via the corresponding clutch. That is, whenever the first turbine 32 is not running, the one-way clutch 36 may be released to automatically (i.e., without operator intervention) decouple the output shaft 120 of the first turbine 32 from the drive train 170 of the pump 30. Whenever the second turbine 34 is not running, the one-way clutch 38 may be released to automatically decouple the output shaft 120 of the second turbine 34 from the drive train 170 of the pump 30. Such operation of the one-way clutches 36 and 38 may be in response to control signals sent to the clutches from a controller (e.g., controller 42 of FIG. 1), or in response to an automated mechanical relationship between the clutch and the corresponding turbine (e.g., flipping a switch).

As an example of the pump system operation, when the pump 30 is operating at a horsepower below a predetermined threshold, the first turbine 32 may be coupled to the pump 30 via the first one-way clutch 36, while the second one-way clutch 38 may be released to decouple the second turbine 34 from the pump 30. That way, the pump 30 may direct fluid to the wellbore using only the first mechanical energy provided from the first turbine 32. When the pump 30 is operating at a horsepower above the predetermined threshold, the second turbine 34 may be coupled to the pump 30 via the second one-way clutch 36 along with the first turbine 32, and the pump 30 may direct fluid to the wellbore using the first mechanical energy from the first turbine 32 combined with the second mechanical energy from the second turbine 34.

This automatic decoupling of the turbines 32 and 34 from the pump 30 using the corresponding clutches 36 and 38 may be the result of an intentional operation of the pump system 16. For example, when the load on the pump 30 is below the predetermined threshold, just one turbine (32 or 34) may be operated to provide all the mechanical energy for driving the pump 30. At the same time, the pump system 16 may automatically release the one-way clutch (38 or 36) corresponding to the non-running turbine to release that turbine from engagement with the drive train 170 of the pump 30. When the load on the pump 30 is above the predetermined threshold, both turbines 32 and 34 may be operated to provide the mechanical energy for driving the pump 30. At the same time, the pump system 16 may automatically transition the one-way clutch (38 or 36) back to a position that allows the output shaft of the previously non-running turbine to transmit torque to the drive train 170 of the pump 30.

The automatic decoupling of the turbines 32 and 34 from the pump 30 using the corresponding clutches 36 and 38 may also be the result of an unexpected turbine failure. For example, if both turbines 32 and 34 are operating to provide mechanical energy to the drive train 170 of the pump 30 and one of the turbines (e.g., 32 or 34) malfunctions such that it no longer generates mechanical energy, the corresponding one-way clutch (e.g., 36 or 38) may automatically decouple the malfunctioning turbine from the pump 30. In such instances, a controller may send a control signal to increase the power of the remaining turbine (e.g., 34 or 32) that is still coupled to the pump 30, so that the maximum amount of available mechanical energy is being provided from the remaining turbine to the pump 30. This may improve the reliability of the pump system 16 since, upon failure of a turbine (32 or 34), only up to approximately one half of the treatment fluid flow rate from the pump 30 is lost.

In the event that only one turbine (e.g., 32 or 34) is being used to power the pump 30 at low loads and that turbine malfunctions, the corresponding one-way clutch (e.g., 36 or 38) may automatically decouple the malfunctioning turbine from the pump 30 while the other turbine is powered up and coupled to the pump 30 via the corresponding one-way clutch to provide mechanical energy for operating the pump 30.

There are multiple possible arrangements of the mechanical components that enable the disclosed dual turbine direct drive pump system 16 to operate as described above. For example, as illustrated in FIGS. 2A and 2B, the pump system 16 may include a pump 30 with a crankshaft 172, and the two turbines 32 and 34 are coupled to opposite ends of the crankshaft 172 via the corresponding one-way clutches 36 and 38. The crankshaft 172 of the pump 30 may convert rotational mechanical energy into reciprocating movement of a number of reciprocating pistons 174 of the pump 30.

As illustrated, the turbines 32 and 34 may include gearboxes 176 and 178, respectively, installed thereon. The gearboxes 176 and 178 may reduce the output speed of the turbines 32 and 34 to a speed that is usable by the pump 30. The gearbox 176 of the first turbine 32 may be coupled between the output shaft 120 of the turbine 32 and a drive shaft 180 that connects the first turbine 32 to the first one-way clutch 36. Similarly, the gearbox 178 of the second turbine 34 may be coupled between the output shaft 120 of the turbine 34 and a drive shaft 182 that connects the second turbine 34 to the second one-way clutch 38. The gearboxes 176 and 178 may each reduce the speed of rotation from a speed on the order of approximately 16,000 rpms at the output shaft 120 of the respective turbines (32 and 34) to a speed on the order of approximately 1,800 rpms at the respective drive shafts (180 and 182). These reduction ranges are merely an example, and other degrees of speed reduction may be available through gearboxes 176 and 178 that are disposed on the turbines 32 and 34.

The gearboxes 176 and 178 on the turbines 32 and 34 may include basically identical gearing. However, one of the gearboxes (176 or 178) may be a reversing gearbox that reduces the speed of rotation and reverses the direction of rotation from the corresponding turbine. A reversing gearbox may be desired since inputs from the turbines 32 and 34 to the pump 30 from opposite ends of the crankshaft 172 must turn in opposite directions.

As illustrated in FIG. 2A, the pump 30 may also include a gearbox 184 that acts as an additional gear reducer to further adjust (e.g., reduce) the speed of rotation of the crankshaft 172 in response to the torque transmitted from one or both turbines 32 and 34. As shown in FIG. 2B, however, such a gearbox might not be present on the pump 30. Instead, all the reduction of rotational speed from the output shafts 120 of one or both turbines 32 and 34 may be accomplished through the gearboxes 176 and 178 on board the turbines 32 and 34.

The arrangement of the pump system 16 having two turbines 32 and 34 may eliminate the need for a multi-speed gearbox on the pump 30, thereby allowing smoother control of pump speed and consequently flow rate of fluid output from the pump 30. This is because each of the turbines 32 and 34 (with appropriately sized speed reduction gearboxes 176 and 178) may be able to output a much greater range of speeds to the pump 30, as opposed to a typical diesel engine driven pump which has a limited range of about 1500-1900 rpms. In addition to the increased speed range of each turbine compared to a diesel engine, the pump system 16 can utilize one or both turbines 32 and 34, thereby enabling twice the range of speeds at a common pressure that would be available if only one turbine were coupled to the pump 30.

Figure 3A:
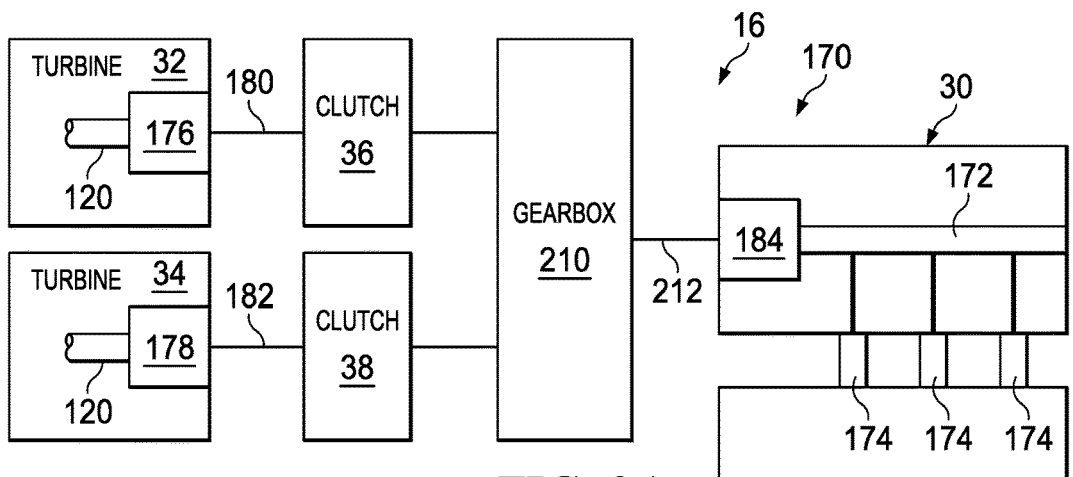
FIGS. 3A and 3B are diagrams illustrating a dual turbine direct drive pump system with turbines disposed on the same side of a pump, in accordance with an embodiment of the present disclosure.
Figure 3B:
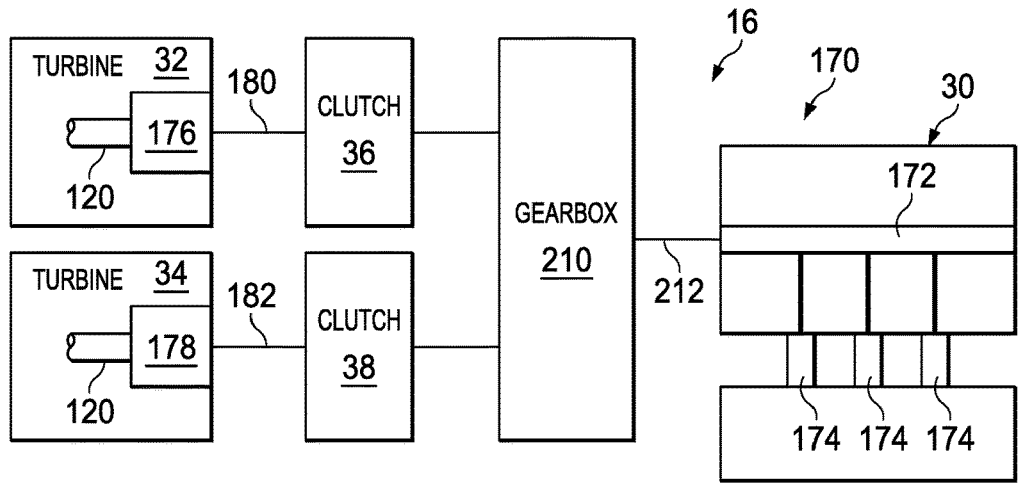

FIGS. 3A and 3B illustrate other examples of the disclosed dual turbine direct drive pump system 16. As illustrated, the pump system 16 may be arranged such that the two turbines 32 and 34 are coupled to the same side of the pump 30 (i.e., one end of the crankshaft 172) instead of opposite sides as in FIGS. 2A and 2B. The two turbines 32 and 34 may be positioned side by side and releasably coupled to the pump 30 via the two one-way clutches 36 and 38 and a gearbox 210. Specifically, the first turbine 32 is releasably coupled to the gearbox 210 via the first one-way clutch 36, and the second turbine 34 is releasably coupled to the gearbox 210 via the second one-way clutch 38. The gearbox 210, as illustrated, may be separate from the pump 30 and coupled to one end of the pump crankshaft 172 via an output shaft 212 extending from the gearbox 210.

The turbines 32 and 34, one-way clutches 36 and 38, and pump 30 in FIGS. 3A and 3B may operate similarly to those same components as described at length above with reference to FIGS. 1, 2A, and 2B. Specifically, the turbines 32 and 34 may enable more efficient control of the speed of the pump 30 as compared to a pump system using just one turbine to supply all the power for pump operation. This is because just one of the turbines 32 and 34 may be operated to supply mechanical energy to the pump 30 when the desired horsepower from the pump 30 is below a predetermined threshold, and both turbines 32 and 34 may be operated at the same time to supply a combined mechanical energy to the pump 30 when the horsepower from the pump 30 is above the threshold. Additionally, the dual turbine pump system 16 enables the pump 30 to continue operating using one of the turbines 32 or 34 if the other turbine goes down unexpectedly. The one-way clutch 36 may automatically release to decouple the first turbine 32 from the gearbox 210 in the event of the turbine 32 malfunctioning or when the turbine 32 is not being operated to supply mechanical energy to the pump 30. The one-way clutch 38 may automatically release to decouple the second turbine 34 from the gearbox 210 in the event of the turbine 34 malfunctioning or when the turbine 34 is not being operated to supply mechanical energy to the pump 30.

The gearbox 210 may include gearing designed to combine the mechanical energy output from each of the turbines 32 and 34 that are connected to the gearbox 210 via their respective clutches 36 and 38. The gearbox 210 then outputs the combined mechanical energy to the pump 30 via the output shaft 212. In some embodiments, the gearbox 210 may also reduce or otherwise adjust the speed of rotation of the output shaft 212 for operating the pump 30 at a desired flow rate.

As illustrated, the turbines 32 and 34 may include gearboxes 176 and 178, respectively, installed thereon. The gearboxes 176 and 178 may reduce the turbine speed of the turbines 32 and 34 to a speed that is usable by the pump 30, as described above with reference to FIGS. 2A and 2B. The gearbox 176 of the first turbine 32 may be coupled between the output shaft 120 of the turbine 32 and a drive shaft 180 that connects the first turbine 32 to the first one-way clutch 36. Similarly, the gearbox 178 of the second turbine 34 may be coupled between the output shaft 120 of the turbine 34 and a drive shaft 182 that connects the second turbine 34 to the second one-way clutch 38.

The side-by-side arrangement of the two turbines 32 and 34 in FIGS. 3A and 3B may be particularly useful since the gearboxes 176 and 178 on the turbines 32 and 34 may utilize identical gearing. There is no need for a reversing gearbox on one of the turbines since their drive shafts 180 and 182 are being turned in the same direction and the combined mechanical energy from the turbines 32 and 34 is input to one side of the pump crankshaft 172. The turbines 32 and 34 that are used in combination to operate the pump system 16 of FIGS. 3A and 3B may be manufactured identically, allowing relatively easier manufacturing and assembly of the pump system 16 than would be available using the turbines 32 and 34 with different gearing of FIGS. 2A and 2B.

As illustrated in FIG. 3A, the pump 30 may also include a gearbox 184 that acts as an additional gear reducer to further adjust (e.g., reduce) the speed of rotation of the crankshaft 172 in response to the torque transmitted from one or both turbines 32 and 34. In such instances, the gearbox 210 between the clutches 36 and 38 and the pump 30 may function merely as a splitter gearbox. As shown in FIG. 3B, however, a gearbox might not be present on the pump 30. Instead, all the reduction of rotational speed from the output shaft 120 of one or both turbines 32 and 34 may be accomplished through the gearboxes 176 and 178 on board the turbines 32 and 34 and/or the intermediate gearbox 210.

The arrangement of the pump system 16 having two turbines 32 and 34 may eliminate the need for a multi-speed gearbox on the pump 30, thereby allowing smoother control of pump speed and consequently flow rate of fluid output from the pump 30. This is because each of the turbines 32 and 34 (with appropriately sized speed reduction gearboxes 176 and 178) may be able to output a much greater range of speeds to the pump 30, as opposed to a typical diesel engine driven pump which has a limited range of about 1500-1900 rpms. In addition to the increased speed range of each turbine compared to a diesel engine, the pump system 16 can utilize one or both turbines 32 and 34, thereby enabling twice the range of speeds at a common pressure that would be available if only one turbine were coupled to the pump 30.

In FIG. 3A, the two turbines 32 and 34, their respective one-way clutches 36 and 38, and the gearbox 210 may be retrofit to an existing pump 30 having a gearbox 184 disposed thereon. For example, an existing reciprocating pump may already include a gearbox within its drive train to adjust the speed of rotation of the crankshaft. However, instead of receiving mechanical energy from a diesel engine, the same pump may be coupled via the gearbox 210 and the one-way clutches 36 and 38 to the two turbines 32 and 34. The turbines 32 and 34 with their gearboxes 176 and 178 used in combination with the standalone gearbox 210 may facilitate a speed reduction from the turbines 32 and 34 that mimics the power output of a typical diesel engine, so that the more efficient turbine arrangement can be used with already existing pumps.

Although the present disclosure and its advantages have been described in detail, it should be understood that various changes, substitutions and alterations can be made herein without departing from the spirit and scope of the disclosure as defined by the following claims.

What is claimed is:

1. A system, comprising:
   a pump;
   a first turbine for generating first mechanical energy to power the pump;
   a second turbine for generating second mechanical energy to power the pump;
   a first one-way clutch coupled between the first turbine and the pump for selectively providing the first mechanical energy from the first turbine to the pump; and
   a second one-way clutch coupled between the second turbine and the pump for selectively providing the second mechanical energy from the second turbine to the pump; and
   a controller communicatively coupled to the first turbine, the second turbine, the first one-way clutch, and the second one-way clutch, wherein the controller controls a speed of the pump, wherein:
   the pump is configured to be coupled to a fluid manifold used to provide fluid communication between the pump and a wellbore,
   in an inactive period during which the pump is not engaged to pump fluid to the wellbore, the first turbine is coupled to the pump via the first one-way clutch, the second one-way clutch is released to decouple the second turbine from the pump, and torque is provided to the pump using only the first mechanical energy; and
   in an active period during which the pump is engaged to pump fluid to the wellbore and the pump is operating at a horsepower above a predetermined threshold, the first turbine is coupled to the pump via the first one-way clutch, the second turbine is coupled to the pump via the second one-way clutch, and the pump directs the fluid using the first mechanical energy and the second mechanical energy.

2. The system of claim 1, wherein the first turbine is coupled to a first end of a crankshaft of the pump via the first one-way clutch, and wherein the second turbine is coupled to a second end of the crankshaft opposite the first end via the second one-way clutch.

3. The system of claim 2, wherein the first turbine comprises a speed reduction gearbox, and wherein the second turbine comprises a reversing speed reduction gearbox.

4. The system of claim 2, further comprising a pump gearbox disposed on the pump and coupled to the crankshaft to condition the first mechanical energy and second mechanical energy for use by the pump.

5. The system of claim 1, further comprising a gearbox coupled to the first one-way clutch, the second one-way clutch, and a crankshaft of the pump, wherein the gearbox combines first mechanical energy from the first turbine with second mechanical energy from the second turbine and outputs a combined mechanical energy to the crankshaft of the pump.

6. The system of claim 5, further comprising a pump gearbox disposed on the pump, wherein the pump gearbox is coupled to the gearbox to condition the combined mechanical energy for use by the pump.

7. The system of claim 5, wherein the first turbine comprises a first speed reduction gearbox that is separate from the gearbox, and wherein the second turbine comprises a second speed reduction gearbox that is separate from the gearbox.

8. The system of claim 1, wherein the first one-way clutch and the second one-way clutch each comprise a clutch selected from the group consisting of: a one-way sprag clutch and a one-way electromagnetic power clutch.

9. The system of claim 1, further comprising a skid or trailer onto which the pump, first and second turbines, and first and second one-way clutches are mounted.

10. The system of claim 1, further comprising:
the fluid manifold providing fluid communication between the pump and the wellbore; and
at least one of a fluid management system and a blender unit providing a source of treatment fluids to the pump.

11. A method, comprising:
generating first mechanical energy with a first turbine;
generating second mechanical energy with a second turbine;
releasably coupling an output shaft of the first turbine to a pump via a first one-way clutch;
releasably coupling an output shaft of the second turbine to the pump via a second one-way clutch;
pressurizing fluid at the pump using the first mechanical energy, the second mechanical energy, or both;
directing the pressurized fluid from the pump to a wellbore via a fluid manifold coupled between the pump and the wellbore;
in an inactive period during which the pump is not engaged to pump fluid to the wellbore, coupling the first turbine to the pump via the first one-way clutch, releasing the second one-way clutch to decouple the second turbine from the pump, and providing torque to the pump using only the first mechanical energy; and
in an active period during which the pump is engaged to pump fluid to the wellbore and the pump is operating at a horsepower above a predetermined threshold, coupling the first turbine to the pump via the first one-way clutch, coupling the second turbine to the pump via the second one-way clutch, and directing the fluid from the pump using the first mechanical energy and the second mechanical energy.

12. The method of claim 11, further comprising:
detecting a malfunction in one of the first turbine or the second turbine; and
automatically releasing the malfunctioning turbine from the pump via the associated one-way clutch in response to detecting the malfunction.

13. The method of claim 11, further comprising controlling a pump speed of the pump via a controller communicatively coupled to the first turbine, the second turbine, the first one-way clutch, and the second one-way clutch.

14. The method of claim 11, further comprising reducing a speed of the output shaft of the first turbine to a speed usable for the pump via a gearbox on the first turbine, and reducing a speed of the output shaft of the second turbine via a gearbox on the second turbine.

15. The method of claim 14, further comprising reversing a direction of rotation of the output shaft of the second turbine via the gearbox disposed on the second turbine.

16. The method of claim 11, further comprising reducing a speed of a crankshaft of the pump via a gearbox disposed on the pump.

17. The method of claim 11, further comprising:
outputting the first mechanical energy from the output shaft of the first turbine to a gearbox that is separate from the pump;
outputting the second mechanical energy from the output shaft of the second turbine to the gearbox;
combining the first and second mechanical energy at the gearbox; and
transmitting the combined mechanical energy from the gearbox to the pump.

18. The method of claim 17, further comprising conditioning the combined mechanical energy for use by the pump via a gearbox disposed on the pump.

19. A system, comprising:
a pump;
a first turbine for generating first mechanical energy to power the pump;
a second turbine for generating second mechanical energy to power the pump;
a first one-way clutch coupled between the first turbine and the pump for selectively providing first mechanical energy from the first turbine to the pump;
a second one-way clutch coupled between the second turbine and the pump for selectively providing second mechanical energy from the second turbine to the pump; and
a fluid manifold disposed between and fluidly coupled to the pump and a wellbore, the fluid manifold configured to provide fluid communication between the pump and the wellbore, wherein:
in an inactive period during which the pump is not engaged to pump fluid to the wellbore, the first turbine is coupled to the pump via the first one-way clutch, the second one-way clutch is released to decouple the second turbine from the pump, and torque is provided to the pump using only the first mechanical energy; and
in an active period during which the pump is engaged to pump fluid to the wellbore and the pump is operating at a horsepower above a predetermined threshold, the first turbine is coupled to the pump via the first one-way clutch, the second turbine is coupled to the pump via the second one-way clutch, and the pump directs the fluid using the first mechanical energy and the second mechanical energy.

20. The system of claim 19, further comprising a skid or trailer onto which the pump, first and second turbines, and first and second one-way clutches are mounted.

* * * * *